United States Patent [19]

Skoch et al.

[11] 4,143,169

[45] Mar. 6, 1979

[54] DRY MINK FEED

[75] Inventors: Leroy V. Skoch; Raymond F. Sewell, both of St. Louis, Mo.

[73] Assignee: Ralston Purina Company, St. Louis, Mo.

[21] Appl. No.: 800,982

[22] Filed: May 26, 1977

[51] Int. Cl.$^2$ ............................................... A23K 1/00
[52] U.S. Cl. ................................... 426/307; 426/448; 426/601; 426/622; 426/623; 426/630; 426/634; 426/646
[58] Field of Search .................... 426/307, 305, 99, 98, 426/293, 302, 656, 448, 646, 302, 601, 622, 805, 807, 623, 630, 634

[56] References Cited

U.S. PATENT DOCUMENTS

| 3,014,800 | 12/1961 | Guidarelli | 426/630 |
| 3,119,691 | 1/1964 | Ludington et al. | 426/302 X |
| 3,284,211 | 11/1966 | Williams | 426/307 |
| 3,529,967 | 9/1970 | Riisberg | 426/656 X |
| 3,623,885 | 11/1971 | Hamdy | 426/802 X |
| 3,908,025 | 9/1975 | Miller et al. | 426/805 X |
| 4,020,187 | 4/1977 | McCulloch et al. | 426/805 X |

*Primary Examiner*—R. B. Penland
*Attorney, Agent, or Firm*—W. Dennis Drehkoff

[57] ABSTRACT

A method of producing a dry, extruded feed for carnivorous animals containing a large amount of proteinaceous materials, a minor amount of farinaceous materials and up to about 24% fat by weight is disclosed. More specifically, a hard dry high fat feed having excellent particle integrity is extruded under conditions of elevated temperature and pressure without the use of materials to selectively bind the fat to the other food ingredients.

11 Claims, No Drawings

DRY MINK FEED

BACKGROUND OF THE INVENTION

The present invention relates to the production of food products for carnivorous animals, especially mink.

Conventional methods for producing dry animal food involve either extrusion or pelleting techniques wherein food materials are formed into the desired shape for acceptance by the animal. Dry animal food is commonly produced by extruding mixed, farinaceous-proteinaceous sources with nutritionally balancing vitamins and minerals and flavor factors. The mixed materials are tempered to a specific moisture range and then subjected to the action of an extruder-cooker which mixes the materials and subjects them to heat at high pressure to convert the materials to a flowable liquid substance. The temperature of the mixed liquid material in the extruder is usually above 212° F. The heated liquid materials are expelled through the extruder die to atmospheric pressure, where the heated moisture flashes to steam causing the material to expand into a cellular mass. The cellular mass is then cut into particles, dried to a stable moisture content and then possibly sprayed with animal fat. Conventional extrusion methods however do not show the incorporation of high amounts of fat into the premix of ingredients or into the extruder for this hampers the operation of the extruder-cooker and tends to form a product that crumbles easily and lacks particle integrity. Usually, fat is applied to the food material upon extrusion. About 2 to about 12% fat can be applied to food material in this manner. See U.S. Pat. Nos. 3,365,297 and 3,115,409. Other processes such as that shown in U.S. Pat. No. 3,623,885 show the extrusion of food materials containing a small amount of fat. However, a binding agent such as α-cellulose or starch must be added to the extrusion mix prior to extrusion in order to bind the fat to the food materials. In this manner, the food materials are able to be cooked in the extruder and still retain some degree of particle integrity.

The other technique used for incorporating fat into animal feed concerns pelletizing. Simply, pelletizing involves the mixture of desired food materials, grinding and heating of the materials, and then forcing the materials through a die of a pellet mill. The amount of added fat in this operation is usually limited to less than 4% and the resultant product will have poor structural quality. Additionally, in more recent processes such as that described in U.S. Pat. No. 3,014,800 and U.S. Pat. No. 2,945,764 the manufacture of high fat pellets is shown by first mixing and comminuting the composite of ingredients, then pelletizing the ingredients, and after drying, applying a hot liquid fat to the surface of the pellets. If the pellets are not dried adequately prior to the application of the fat, the fat will be absorbed by the pellets and a soft product will result. The maximum amount of total fat which can be incorporated within and onto the pellet without causing undesirable crumbling and high percentage of fines is from about 10 to 20%. If too much fat is applied to the surface of the pellets, that is, over 20% by weight, the product will be soft, friable, crumbly and exhibit a greasy texture. Another recent process shown in U.S. Pat. No. 3,993,796 involves using a spray dried blend of protein isolate and edible oil which is mixed with the food ingredients prior to pelletizing.

However, it is desirable that animals such as mink whose nutritional requirements require high levels of fat per unit of diet be provided with a dry expanded product. In accordance therewith, it is highly desirable that an extruded feed containing high amounts of fat is provided in difference to the dry products produced generally by complex pelletizing operations.

SUMMARY OF THE INVENTION

It is an object of this invention to provide an extruded hard dry feed containing up to 24% fat with excellent particle integrity.

Another object of this invention is to provide such high fat nutritionally balanced feed by a process which does not utilize an agent to bind the fat in the extrusion operation.

And yet another object of the present invention is to provide a high fat animal food product comprising a major amount of proteinaceous ingredients, a minor amount of farinaceous ingredients and up to about 24% by weight fat.

The process involves finely grinding proteinaceous and farinaceous food sources and mixing the ground material to provide a nutritious farinaceous-proteinaceous base which has a fine grind and contains animal fat, soybean oil and optionally oleaginous seed full fat meal. The mixed ground material is then extruded to form a puffed, expanded ration. The puffed, expanded material is cut by conventional means as it leaves the extrusion die to form shaped products. Additional fat can then be sprayed upon the surface of the product. The conditions of extrusion cut off are controlled to produce a product which has a bulk density of about 38 lbs/bu. after drying and external fat application and has a product shape of a nature to avoid particle segregation. A preferred embodiment may actually be a triangle having a hollow center.

DESCRIPTION OF THE PREFERRED EMBODIMENTS

In a quest to replace the conventional mink food consisting of surplus fish, and/or fresh offal from slaughter houses, applicant has discovered a unique process for producing a palatable, dry and nutritious mink food material with excellent particle integrity. Preferably, the ration is produced in a nutritionally complete form from mixed farinaceous-proteinaceous sources and fat with additional vitamins and mineral supplements as needed to make the ration nutritionally complete. In utilizing this dry mink food material, the mink rancher has more concise control over nutritional formulation and adequacy of the ration as compared to the conventional wet ration as well as having a greater convenience in feeding.

The farinaceous-proteinaceous mixture may include farinaceous ingredients which may be any of the more common grains, such as corn, wheat, barley, oats, or sorghum and their milled parts such as corn meal, flour, and wheat germ. Commonly, the farinaceous ingredients will be present in amounts of only about 10 to 18% of the total mass.

The farinaceous-proteinaceous mixture will also include a major portion of proteinaceous ingredients, such as oilseed meal, proteinaceous by-product meals, and microbial protein. The by-product means include meat meal, poultry meal, and fish meal, preferably menhaden or anchovy meal; the oilseed meal is preferably soybean meal; and the microbial protein may be from sources such as torula yeast and brewers yeast. These ingredients, preferably present in an amount of about not less than 50% of the total mixture, will provide most of the protein content in the final product. In the preferred embodiment, the ratio of proteinaceous ingredient to farinaceous ingredient may be from about 2.5 to 1 to about 3.00 to 1. A ratio of about 2.75 to 1 would be usual. The proteinaceous ingredients and farinaceous ingredients together may comprise about 70 to about 82% of the total mixture.

The proteinaceous ingredients will normally be selected to provide the necessary level and balance of protein. Preferably, several proteinaceous ingredients will be present. These ingredients will be selected to balance the amino acid composition of each other and the farinaceous ingredients whereby the final mixture is balanced with respect to the desired protein content and facilitate processing in the extruder-cooker.

A critical feature of this invention is the level of fat thay may be added to the basal ration before undergoing extrusion cooking. About 3 to about 6% fat may be added to the farinaceous-proteinaceous ingredients present in the extruder. Upon exiting the extruder an additional amount of about 10 to about 16% fat is added. The term "fat" as employed herein is intended to include liquid and soluble materials comprising triglycerides of fatty acids which are edible. These include animal fat, soybean oil, etc. In prior art processes, mixing in the fat prior to extrusion has been tried but it has been found to interfere with the plasticization of the protein and also inhibits the rate at which the mixture can be fed through the extruder cooker because of the slippage of the screw. The fat present in the ingredients of the feed, i.e. meat meal, fish meal, oleaginous seed, full fat meal, etc., may add about 3 to 5% by weight of the total fat content of the finished product. This should increase the fat content of the final product to be about 24% by weight.

Optional ingredients in the product (typically present in total amount of about 0.5 to 3%) may include: flavoring ingredients such as molasses; coloring ingredients and dye; and vitamins and minerals.

A typical mink food material may be prepared from the following ingredients in Table I.

TABLE I

| INGREDIENTS | PERCENT |
| --- | --- |
| Ground Corn | 14.0 |
| Ground Beet Pulp | 5.0 |
| Brewers Yeast | 2.0 |
| Wheat Germ | 3.0 |
| Dehulled Soy Meal (49%) | 24.0 |
| Fish Meal (Menhaden) | 24.0 |
| Meat Meal | 6.0 |
| Dried Whey | 1.0 |
| Edible Fat | 11.0 |
| Molasses | 2.0 |
| Soybean Oil | 6.5 |
| Dicalcium Phosphate | 1.5 |

The process of the invention is preferably practiced by grinding the farinaceous-proteinaceous material to a fine particle size; preferably the material should be ground to below about 0.039 inch particle size. About 99% of the particles should pass through a #16 Tyler screen. The materials may be ground separately or they may be mixed prior to grinding. After grinding, the farinaceous-proteinaceous materials may be mixed again. The flavor an optional ingredients may be added to the mixture and then placed in a conventional extrusion device, such as that disclosed in U.S. Pat. No. 3,496,858. The rotating screw of the extruder device creates a high pressure on the material in the extruder. It is believed that the particulate material fed in changes form until it finally flows in a generally fluid manner, even squeezing around the outer periphery of the screw in a recirculating fashion, to cause a severe mechanical working of the substance. The pressures in the extruder are elevated to above 100 psig. Part of the pressure is caused by a screw. Part of the pressure is due to the high temperature which results both from friction between the flowing product and components of the extruder and from heat that is purposely added to the outside of the extruder, if under normal operation. This added heat is preferably obtained by passing steam and/or water through a forward or front annular jacket within the extruder chamber. Steam may also be added directly into the extruder to increase the temperature of the material and/or to raise the moisture content of the material if desired. The amount of heat applied is controlled by typical valving techniques in a manner to obtain temperatures which are not sufficiently high as to cause the product to scorch or burn, but which are sufficiently high to cause the desired chemical and physical reactions within the material. The amount of added heat to do this will vary with the particular extruder construction, that can readily be determined by trial and error during the initial stages of operation of the equipment.

As the cooked material emerges from the nozzle or orifice of the extruder under the high internal pressures into the much lower atmospheric pressure, the separate heated moisture partially flashes off by evaporation to cause product expansion and partial cooling. If the product is being processed properly, it emerges in the form of a continuous elongated expanded member which is severed into individual chunks as it emerges by any ordinary cut off means. After extrusion, the product has a bulk density of about 31 to 33 lbs/bu. The expanded product is porous and has a puffed, expanded structure. The product is then dried to a stable moisture content of about 5 to 9% by weight and coated with about 10 to 16% fat to increase the total fat content of the product to be about 24%, preferably 22%. Normally, it is desirable to add coloring materials to the product before extrusion, and to add flavoring before or after extrusion. The finished product has a bulk density of about 36 to 38 lbs/bu.

During the extrusion cooking operation, temperature and pressure of extrusion are controlled to produce a product which will have the desired bulk density when dry. Within the pressure and temperature limits of the extrusion process, the conditions of extrusion are controlled to produce a final product which has a bulk density of about 38 lbs/bu. when dried to a moisture content of about 5 to about 9% by weight. As the temperature varies between about 220° and 300° F. the pressure of extrusion will vary between about 100 and 300 psi. A temperature range of about 220 to 300 and a pressure range of about 100 to 300 psi are preferred, but the preferred parameter to produce an optimum product may vary somewhat due to the design of the particular extruder used.

As the expanded extruder product leaves the extrusion, die, it is cut off by cut off means into the desired shape. This cut off, in cooperation with the shape of the die insures a triangular product with a hollow center that is required to avoid segregation and crumbling of the particles upon storage.

The application of fat in the range of 10% to about 14%, preferably 13% is accomplished in a manner so that the fat does not penetrate the material to the extent necessary to cause disintegration. Nor is the fat applied in a manner to cause the material to have a greasy texture when dried. The fat may be at a temperature of about 110°–130° F. with 120° F. preferred in the use of animal fat. The fat is coated evenly on the surface of the expanded extruded product.

An alternate embodiment of the present invention involves the use of up to about 3% wheat or corn starch in the formulation. The starch acts most likely as a binder to hold the fat within farinaceous and proteinaceous materials as they pass through the extruder. The use of starch in the present invention is not intended to limit the invention but serves merely to illustrate another embodiment of the invention.

Although the inventive concepts will be readily understood from the above description by one having ordinary skill in the art, the following examples are given to assure complete understanding:

EXAMPLE I 100 pounds of nutritionally balanced farinaceous-proteinaceous material was employed having the following composition:

|  | Parts By Weight |
| --- | --- |
| Ground Corn | 14 |
| Ground Beet Pulp | 5 |
| Brewers Yeast | 2 |
| Wheat Germ | 3 |
| Dehulled Soy Meal | 24 |
| Fish Meal (Menhaden) | 24 |
| Meat Meal | 6 |
| Dicalcium Phosphate | 1.5 |
| Dried Whey | 1 |

The materials are then ground in a Prater GH-9 Hammermill using a #4 screen so that about 99% of the ground particles pass through a #16 Tyler screen. Thus, about 99% of the particles are about 0.039 inches in diameter. Next, about 3 parts by weight animal fat is mixed into the mixture of farinaceous-proteinaceous materials as well as about 3 parts by weight soybean oil. The mixture is then placed into a conventional extrusion device with steam and water being supplied to the front jacket to maintain and exit water temperature of 150° to 180° F. and cooling water at room temperature being constantly passed through the rear jacket. The opening in the restraining plate is triangular shaped, with the screw being rotated at 150 rpm. The mixture was thus mechanically worked within the extruder at a temperature of around 250° F., with the pressures varying somewhat but being generally above 100 psig. The material was continuously passed through the extruder, then through an elongated tube and a triangular extruder nozzle. The mixture was ejected from the nozzle in a continuous stream and was a coherent structure which expanded with passage through the nozzle to form a porous structure. The product was then sliced and had a bulk density of 32 lbs/bu. The product was then dried and about 12 parts by weight of animal fat at a temperature of around 120° F. was applied evenly to the product. The product was again dried and packaged.

EXAMPLE II

The product made from the process of the instant invention made according to Example I was fed to two groups of mink, Group A (Demi-Buffs) and Group B (Darks). Additionally, control animals were fed in each group a dry pelleted ration containing 33% crude protein, 18% fat and 5.0% fiber. Results are shown in the following Table II.

TABLE II

| Group A (Demi-Buffs) | | |
| --- | --- | --- |
| Ration | Control | Product of Invention |
| No. of Mink | 25 | 25 |
| Initial Weight in grams | 950 | 953 |
| Final Weight in grams | 2034 | 2020 |
| Average daily feed consumption in grams | 127 | 120 |

| Group B (Darks) | | |
| --- | --- | --- |
| Ration | Control | Product of Invention |
| No. of Mink | 25 | 25 |
| Initial Weight in grams | 877 | 840 |
| Final Weight in grams | 1844 | 1780 |
| Average daily feed consumption in grams | 111 | 103 |

Group A was fed 123 days and Group B was fed 146 days. This test shows that feeding the composition made from the process of the invention results in just as good a growth as those animals receiving a dry pelleted product.

EXAMPLE III

Propagation tests were made with a large number of mink, including Darks and Pastels. 154 females and 32 males were fed the product made from the process of the instant invention for a period of about 6 months. The skip-a-day feeding method was used in conditioning the breeder mink. Average daily consumption was estimated at 2 to 3 ounces per day for the females and approximately 3 to 4 ounces per day for the males.

The following Table III shows the results of the numbers of mink whelped and weaned.

TABLE III

|  | Darks | Pastels |
| --- | --- | --- |
| Females bred | 91 | 63 |
| Females whelped | 87 | 60 |
| Number of kits whelped | 425 | 329 |
| Number of kits weaned | 419 | 326 |
| Average number of kits whelped | 4.60 | 5.23 |
| Average number of kits weaned | 4.60 | 5.20 |

Since a regular mink ranch average of 4.0 kits weaned per litter is normally considered good, the product made from the process of the instant invention whelped and weaned a highly satisfactory kit average.

The product of the invention exhibits excellent particle integrity and does not readily crumble or produce excessive fines, making suitable for handling and storage.

Although the invention has been described in considerable detail with reference to certain preferred embodiments thereof, it will be understood that variations and modifications can be affected within the spirit and scope of the invention as described above and as defined in the appended claims.

What is claimed is:

1. A method of forming an extruded high fat food product for mink having excellent particle integrity containing about 24% fat consisting essentially of the steps of forming a mixture consisting essentially of a combination of farinaceous and proteinaceous ingredients said farinaceous and proteinaceous ingredients together having a fat content of about 3% to 5% and about 3% to 6% added fat by weight of said mixture, plasticizing the mixture in an environment of elevated temperature and pressure, extruding the mixture from said environment of elevated temperature and pressure to an environment of lower temperature and pressure through a restricted orifice thereby forming said mixture into an expanded porous structure, drying said expanded porous product to a stable moisture content of about 5% to 9% by weight and coating said expanded porous product with about 10 to about 16% fat by weight:

2. The method of claim 1 wherein said mixture is constituted by not less than about 50% proteinaceous ingredients and about 10 to 18% farinaceous ingredients.

3. The method of claim 1 wherein said proteinaceous ingredients are selected from the group consisting of vegetable protein, proteinaceous by product meals, and microbial protein.

4. The method of claim 1 wherein said farinaceous ingredients are selected from the group consisting of corn, wheat, barley, oats, sorghum grain and their milled components, corn meal and wheat germ.

5. The method of claim 1 wherein said environment of elevated temperature and pressure is at a temperature of between about 220° F. to 300° F.

6. The method of claim 1 wherein said environment of elevated temperature and pressure is at a pressure of between about 100 to 300 psi.

7. A method of forming an extruded high fat food product for mink having excellent particle integrity containing and 24% fat consisting essentially of the steps:

forming a mixture comprising a combination of farinaceous and proteinaceous ingredients said farinaceous and proteinaceous ingredients together having a fat content of about 3 to about 5% by weight and about 3 to about 6% added fat by weight of said mixture, plasticizing the mixture in an environment of elevated temperature in the range of about 220° F. to 300° F. and elevated pressure, extruding the mixture from said environment of elevated temperature and pressure to an environment of lower temperature and pressure through a restricted orifice thereby forming said mixture into an expanded porous structure, drying said expanded porous product to a stable moisture content of about 5 to 9% by weight and coating said expanded porous product with about 10 to about 16% fat by weight.

8. The method of claim 7 wherein said mixture is constituted by not less than about 50% proteinaceous ingredients and about 10 to 18% farinaceous ingredients.

9. The method of claim 7 wherein said proteinaceous ingredients are selected from the group consisting of vegetable protein, proteinaceous by-product meals, and microbial protein.

10. The method of claim 7 wherein said farinaceous ingredients are selected from the group consisting of corn, wheat, barley, oats, sorghum grain and their milled components corn meal and wheat germ.

11. The method of claim 7 wherein said environment of elevated pressure is in a range of about 100 to 300 psi.

* * * * *